May 31, 1927.
E. WIRTH
1,630,648
ABSORPTION REFRIGERATOR
Filed Nov. 18, 1924
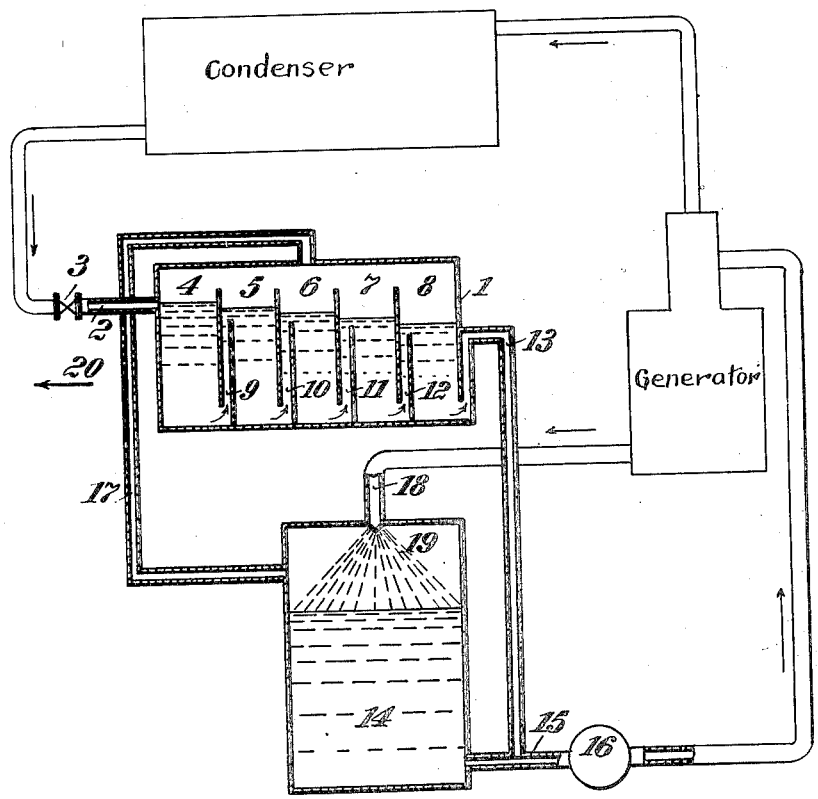

Patented May 31, 1927.

1,630,648

UNITED STATES PATENT OFFICE.

ELIAS WIRTH, OF WINTERTHUR, SWITZERLAND, ASSIGNOR TO SULZER FRERES SOCIETE ANONYME, OF WINTERTHUR, SWITZERLAND, A CORPORATION OF SWITZERLAND.

ABSORPTION REFRIGERATOR.

Application filed November 18, 1924, Serial No. 750,534, and in the Netherlands December 22, 1923.

This invention relates to absorption refrigerating machines, especially of the continuously acting type and has for its object to provide means whereby such liquid solvent as has been distilled over from the generator into the evaporator is discharged automatically therefrom.

According to this invention the evaporator is so constructed that the liquid richest in solvent collects in a part of the evaporator close to the outlet from which a by-pass passage leads to the absorber. Conveniently the evaporator is divided up into chambers so connected to one another that the weakest solution (i. e. that containing most solvent) collects in the last chamber, and the by-pass passage which is connected to this chamber is preferably so formed and situated that a definite proportion of the contents of the chamber may be discharged by a siphon action into the absorber. The absorber may also be divided up into separate chambers which are separately connected to the corresponding chambers of the evaporator. The by-pass passage preferably enters the absorber at a point where the solution is highly concentrated.

A preferred construction according to the invention is illustrated diagrammatically by way of example in the accompanying drawing.

In this construction the evaporator 1 is connected through a pipe 2 controlled by a valve 3 with the condenser. The evaporator is divided into separate chambers 4—8 which are connected together through passages 9—12. The last chamber 8 is provided with a by-pass passage 13, which may be arranged to exert a partial or complete siphon action thereon, and which opens into a pipe 15 leading from the absorber 14 to the generator a pump 16 being provided in the pipe 15. The vapour spaces in the evaporator 1 are connected through a suction pipe 17 with the absorber 14, which receives the weak solution through a pipe 18 provided with a spraying device 19.

The liquid from the condenser enters the first chamber 4 of the evaporator through the valve-controlled pipe 2, and passes downwards through each chamber in turn, so that the refrigerant is more and more separated out from the solvent, until in the last chamber 8 only a very weak solution is present, the vapourized refrigerant being sucked out from all the chambers at equal pressure through the pipe 17. The weak solution in the last chamber 8 is discharged through the by-pass passage in amount depending upon the amount of fresh liquid introduced through the pipe 2. Since the liquid solvent withdrawn from the evaporator still contains a certain amount of refrigerant, it is preferable, as shown, to let the by-pass passage open into the absorber at a point where the solution is already concentrated, as for example at the outlet from the absorber into the pipe leading to the generator.

The action in the evaporator can be assisted by passing the medium to be cooled in a direction as shown by the arrow 20 opposite to that of the liquid refrigerant therein. Thus the warmer part of this medium is led first past the chambers containing the weakest solution, whilst the colder medium passes the chambers containing the most highly concentrated solution.

The evaporation may be divided up into stages by connecting the various chambers of the evaporator through separate absorption pipes to corresponding chambers provided for the purpose in the absorber. Thus the arrangement may be such that the lowest pressure obtains in the last chamber 8, which is then connected to a chamber in the absorber containing the weakest solution received directly from the generator through the pipe 18.

What I claim as my invention and desire to secure by Letters Patent is:—

1. In an absorption refrigerating system including a generator, condenser and absorber an evaporator comprising a plurality of liquid chambers, connecting passages between said chambers, a vapor chamber above said liquid chambers, means for connecting one of said liquid chambers to said condenser, means for connecting another of said liquid chambers to said absorber, and means for connecting said vapor chamber to said absorber.

2. In an absorption refrigerating system including a generator, condenser and absorber an evaporator comprising a plurality of liquid chambers, a vapor chamber above said liquid chambers, means for introducing refrigerant solution into one of said liquid chambers from said condenser, connecting passages between said liquid chambers for transferring said refrigerant solution to successive liquid chambers, and means connected to another of said liquid chambers for conveying said refrigerant solution to said absorber.

3. In an absorption refrigerating system including a generator, condenser and absorber an evaporator comprising a plurality of liquid chambers, a vapor chamber above said liquid chambers, means for introducing refrigerant solution into the first of said liquid chambers from said condenser, connecting passages between the bottom of one liquid chamber and the top of the next liquid chamber for transferring said refrigerant solution to successive liquid chambers, and means connected to the last of said liquid chambers for conveying said refrigerant solution to said absorber.

4. In an absorption refrigerating system including a generator, condenser and absorber an evaporator comprising a plurality of interconnected liquid chambers, a vapor chamber above said liquid chambers, means for introducing refrigerant solution into the first liquid chamber from said condenser, means for connecting said vapor chamber to said absorber, and a siphon connection between the last of said liquid chambers and said absorber.

5. In an absorption refrigerating system including a generator, condenser and absorber an evaporator comprising a vapor chamber, a plurality of interconnected liquid chambers opening into said vapor chamber, means for introducing concentrated refrigerant solution into the first liquid chamber from said condenser, connecting passages between said liquid chambers for transferring said refrigerant solution from one liquid chamber to another whereby the refrigerant in solution is vaporized to reduce the successive concentration of the solution in successive liquid chambers, means connected to said vapor chamber for conveying said vaporized refrigerant to said absorber, and means connected to the last of said liquid chambers for conveying the weak refrigerant solution to said absorber.

6. In an absorption refrigerating system including a generator, condenser and absorber an evaporator comprising a vapor chamber, a plurality of interconnected liquid chambers opening into said vapor chamber, means for introducing concentrated refrigerant solution into the first liquid chamber from said condenser, connecting passages between said liquid chambers for transferring said refrigerant solution from one liquid chamber to another whereby the refrigerant in solution is vaporized to reduce the successive concentration of the solution in successive liquid chambers, means connected to said vapor chamber for conveying said vaporized refrigerant to said absorber, and means connected to the last of said liquid chambers for conveying the weak refrigerant solution to the passage connecting said absorber with said generator.

In testimony whereof I have affixed my signature.

ELIAS WIRTH.